United States Patent [19]

Truong et al.

[11] Patent Number: 5,215,681
[45] Date of Patent: Jun. 1, 1993

[54] CONCENTRATED LIQUID SOLUTIONS OF SCLEROGLUCAN

[75] Inventors: Dinh N. Truong, Pau; Jacques Gadioux, Orthez; Dominique Sarazin, Strasbourg, all of France

[73] Assignee: Societe Nationale Elf Aquitaine, Courbevoie, France

[21] Appl. No.: 441,772

[22] Filed: Nov. 27, 1989

[30] Foreign Application Priority Data

Nov. 25, 1988 [FR] France ................... 88 15457

[51] Int. Cl.⁵ .............. B01J 13/00; C07H 1/06; C13K 1/04
[52] U.S. Cl. .................. 252/311; 252/315.3; 536/124; 536/127
[58] Field of Search ............ 252/315.3, 311; 536/127, 124; 210/650; 127/53, 54

[56] References Cited

U.S. PATENT DOCUMENTS

| | | | |
|---|---|---|---|
| 3,301,848 | 1/1967 | Halleck | 536/1.1 |
| 3,355,447 | 11/1967 | O'Connell | 252/311 X |
| 4,160,726 | 7/1979 | DelPico | 210/651 X |
| 4,299,825 | 11/1981 | Lee | 252/8.55 X |
| 4,525,515 | 6/1985 | Peignier et al. | 106/208 X |
| 4,667,026 | 5/1987 | Jarry et al. | 536/114 |
| 4,894,335 | 1/1990 | Peignier et al. | 252/8.511 X |
| 4,960,697 | 10/1990 | Johal et al. | 435/101 |
| 5,003,060 | 3/1991 | Vinot | 252/363.5 X |

FOREIGN PATENT DOCUMENTS

| | | | |
|---|---|---|---|
| 1185539 | 4/1985 | Canada | 210/650 |
| 2600336 | 12/1987 | France . | |
| 2211195A | 6/1989 | United Kingdom . | |

OTHER PUBLICATIONS

*Industrial Gums Polysacharides and there Derivatives*, Roy L. Wistler (Academic Press, N.Y. 1973) pp. 502-505.
Derwent Abstract, 80-72032C/41 (corresponding to EP 0016640).
Derwent Abstract, 81-83838D/46 (corresponding to EP 0039128).
Derwent Abstract, 88-044266/07.

*Primary Examiner*—Robert L. Stoll
*Assistant Examiner*—Daniel S. Metzmaier
*Attorney, Agent, or Firm*—Oblon, Spivak, McClelland, Maier & Neustadt

[57] ABSTRACT

The invention relates to new concentrated liquid solutions of polysaccharides, characterized in that they are prepared by ultrafiltration of a dilute solution of polymer to which a surface-active agent has been added.

The solutions can be employed, after dilution, in particular as a thickening agent for aqueous fluids.

9 Claims, No Drawings

CONCENTRATED LIQUID SOLUTIONS OF SCLEROGLUCAN

The present invention relates to liquid concentrated solutions of water-soluble polysaccharides to processes for obtaining them and to their use as an agent for raising the viscosity of aqueous media.

Because of their strongly thickening properties and of their rheology, polysaccharides have found many industrial applications, especially in the alimentary field and in that of paint, paper, textiles, cosmetics, building, in water treatment, in the oil industry, for example in drilling muds, completion fluids, for well treatment, improved recovery of hydrocarbons, etc., and more recently as "stabilizers" for an emulsion such as hydrocarbon or bitumen or suspension emulsions.

For the majority of these applications, these polymers must be converted into the form of a more or less dilute solution. Quite frequently, for practical reasons, these polymers are in the form of powders obtained by precipitating the polymer from the medium in which it is manufactured. It is well known that the chief disadvantage of powders of a water-soluble polymer is their difficulty in dissolving rapidly and completely, even with violent stirring. In contact with water, a thin film of swollen "gel" forms on the surface, coating the polymer particle and thus generally results in "lumps" and accumulations which are difficult to disperse and are "insoluble" even over considerable dissolving times. Furthermore, with the current preparation type (alcoholic precipitation), the polymer powder is the least economical of the packaging forms and presents problems of safety because of the fine particles which are responsible for clouds of dust.

To attempt to solve these problems, improved formulations have been proposed in the form of powder or of "liquid" compositions with high concentrations of active substance. The following have been recommended in powder form: a powder with solubilization controlled by partial and reversible crosslinking with dialdehydes, French Patent no. 2,371,462; a powder coated with a protective layer of a paraffinic product which is removed in hot water, French Patent no. 2,487,368; a powder to which a strongly hydrophilic material such as silica has been added, French Patent no. 2,516,517; a powder having an improved wettability after treatment with surfactants, or else in the form of a porous granulate, European Patent no. 0,254,603. These formulations in powder form appear to solve the problem of the formation of aggregates during their dissolving, but leave remaining that of the complete dissolving of the polymer, which depends on characteristics which are specific to the powder, such as the hydration state, the crystallinity, the molecular bonds in the solid state, and the like.

Liquid compositions have also been proposed which can be present either in the form of suspensions in an organic liquid which is not a solvent the polymer: French Patent no 2,531,093 and no. 2,540,879, European Patents no. 0,016,640 and no. 0,039,128, or in the form of emulsions, French Patent no. 2,548,676. The formulations in the form of a suspension present the same disadvantages as the powders insofar as the complete dissolution, which is difficult, is concerned. Only the formulations in the form of an emulsion dissolve rapidly and perfectly in an aqueous phase. However, in most cases, these "liquid" formulations exhibit a considerable lack of stability resulting in separation phenomena in the case of extended storage in unstirred or unthermostated vessels.

Furthermore, in the case of applications such as the improved recovery of hydrocarbons, formulations of polymers of the polysaccharide type have been proposed, to which surface-active agents were added, improving their properties in the application French Patent no. 2,600,336 may be mentioned by way of example. However, it must be noted that the polymer and surfactant contents of these formulations are low, of the order of a few hundred ppm in the case of the polymer and a few thousand ppm in the case of the surfactants.

The present invention enables all these problems to be overcome by proposing liquid solutions which are concentrated in respect of polysaccharide, with high contents of active substance, exhibiting low viscosities and the flow and use characteristics of liquids, that is to say:

pumpable polymer solutions, solutions of perfectly dissolved and dispersed polymer, which are ready for use, requiring no predissolving and rapidly put to use merely using dilution.

"Liquid solutions" means fluids exhibiting flow characteristics, that is to say capable of being easily conveyed using conventional industrial pumping systems.

The liquid solutions concentrated in respect of polysaccharide are characterized by the presence of a high content of appropriate surfactants.

The liquid solutions concentrated in respect of polysaccharide will comprise from 5 to 40% by weight of polysaccharides and from 2 to 30% by weight of surfactants, and preferably from 10 to 30% by weight of polysaccharide and from 5 to 20% by weight of surfactants.

It is obvious that the choice of the surfactant and of the polysaccharide, as well as the surfactant/polysaccharide weight ratio, will be arrived at as a function of the envisaged final application.

This weight ratio will be generally chosen between 0.2 and 8 and preferably between 0.5 and 5.

To make up the concentrated liquid solutions of the invention, polysaccharides obtained by biosynthesis will be chosen, such as, for example, scleroglucan, a water-soluble nonionic polysaccharide obtained by fermentation on carbohydrate substrates of a fungus of the Sclerotium rolfsii (ATCC 15206) type or else of the Sclerotium glucanicum type, or schizophyllan, a polysaccharide of a similar structure, synthesized by the common Schizophyllum fungus.

These biopolymers are generally available in two forms: either in liquid form, which is then generally the fermentation medium which has been sterilized and filtered to remove the biomass, or in solid form, the biopolymer having then been precipitated and dried.

To make up the concentrated liquid solutions of the invention, either an anionic surface-active agent or a neutral surface-active agent or a mixture of the two will be chosen.

The surface-active agent chosen will have to exhibit a certain lipophilic (hydrophobic) character, characterized by a hydrophile-lipophile balance (HLB) of less than 20 and preferably less than 16.

The HLB coefficient corresponds to the following formula:

$HLB = 20(1 - M_o/M)$ in which $M_o$ is the mass of the organic fraction of the molecule and M its total mass.

The surface-active agent or agents will be added in such quantity that a possible precipitation of the polymer is avoided.

The following can, for example, be employed as an anionic surface-agent:

fatty acid soaps such as the sodium or potassium salts of saturated or unsaturated $C_6$-$C_{24}$ fatty acids or of aminocarboxylic acid derivatives such as sodium N-laurylsarcosinate, sulphates and sulphated products such as alkali metal alkyl sulphates of the sodium lauryl sulphate type: sulphates of polyoxyethylenated fatty alcohols, sulphates of polyoxyethylenated alkylphenols and sulphates of polyoxyethylenated arylalkylphenols, phosphoric esters of oxyethylenated derivatives such as phosphates of polyoxyethylenated fatty alcohols, phosphates of polyoxyethylenated alkylphenols and phosphates of polyoxyethylenated arylalkylphenols, alkali metal sulphonates such as alkylsulphonates, for example alkylsulpho esters of $C_4$-$C_{30}$ acids of the sodium dialkylsulphosuccinate type, alkylbenzenesulphonates such as sodium nonylbenzenesulphonate and sodium dodecylbenzenesulphonate and lignosulphonates.

The following may be envisaged as neutral surfactants, a preferred class of the invention:

polyoxyethylenated alkylphenols such as polyoxyethylenated nonylphenol, polyoxyethylenated dinonylphenol, polyoxyethylenated tributylphenol, polyoxyethylenated dodecylphenol, polyoxyethylenated and/or polyoxyethylenated fatty alcohols and fatty acids, polyoxyethylenated and/or polyoxyethylenated fatty acid alkanolamides, polyol esters, such as the glycerol or propylene glycol esters of fatty acids, of alimentary oils and fats, mixtures of fatty acids and of acetic and/or lactic and-/or citric and/or tartaric acid, sucrose esters such as sugar esters and sugar glycerides, sorbitan fatty acid esters and their polyoxyethylenated and polyoxyethylenated derivatives such as polyoxyethylenated esters of polyethylene glycol or of polypropylene glycol, polyoxyethylenated sorbitan esters, polyoxyethylenated tartaric acid esters and polyoxyethylenated oleic glycerides.

The surfactants found particularly advantageous are the polyoxyethylenated mono-, di- and trialkylphenols containing between 5 and 20 polyoxyethylenated units.

The concentrated liquid solutions are prepared by concentration of dilute solutions of biopolysaccharides such as those obtained from the fermentation medium, suitably treated by sterilization and removal of the cell debris. These dilute solutions generally contain approximately 0.5% by weight of biopolymer.

In the case of this last method of manufacture of the solutions of the invention, it will be particularly advantageous to subject the dilute solution to an ultrafiltration in the presence of an appropriate quantity of surface-active agent. It has surprisingly been found, in fact, that the presence of surface-active agent, on the one hand, increased the overall flow rate of the permeate (water and other molecules of low molecular mass) through the membrane, but, on the other hand, if its concentration was judiciously chosen, made it possible, by lowering the viscosity of the medium by a factor of the order of 100, to increase the quantity of polymer collected and hence to multiply the concentration ratio by a factor of 4. A membrane which has a cut-off threshold of between 20,000 and 100,000 daltons will be employed.

The solutions of the invention and processes for their preparation are illustrated by the following examples, which are given by way of simple illustration.

EXAMPLE 1: PREPARATION OF CONCENTRATED SOLUTIONS OF SCLEROGLUCAN, OBTAINED BY ULTRAFILTRATION: ROLE OF THE SURFACTANT

The concentrated solutions of scleroglucan are prepared in the presence or absence of surfactant (Sepawet 5432 - BASF trademark: oxyethylenated dinonylphenol, HLB: 12) by ultrafiltration.

The ultrafiltration technique is based on the selectivity of the flow of the molecules according to their size through the pores, of well-determined dimension, of a membrane An organic membrane of Amicon YM100 ($\phi = 62$ mm) type was employed together with a laboratory ultrafiltration unit with tangential agitation (Amicon 8200).

Two solutions feed 2 units continuously from a storage vessel at a constant pressure of 2 bars, one containing 0.2% by weight of scleroglucan (CS11L), used as a control, the other of the same quantity of polymer but in the presence of 0.5% by weight of Sepawet 5432 (BASF). The flow rates of the permeates in each unit are measured as a function of time and of the final concentrations of polymer and of surfactants in the concentrated solutions. The results obtained are given in Table 1 below.

TABLE 1

| Characteristics Initial solutions | Weight of permeate after 200 hours | Final concentrations/ time needed | Appearance of the concentrate |
|---|---|---|---|
| Crude filtrate containing 0.2% of polymer | 280 g | 25 g/l/555 h | solid gel |
| Crude filtrate containing 0.2% of polymer + 0.5% surfactant | 550 g | 100 g/l/460 h | viscous solution |

The advantage of the example also lies in the fact that very little surfactant passes through the membrane employed (<2%); at the same time, the polymer and the surfactant are reconcentrated during the operation, one tending to increase the viscosity of the solution, the other to decrease it. The overall effect obtained is a perfectly fluid viscous solution.

Thus, in the presence of surfactant, there is a significant increase in the overall flow rate of the permeate and high polymer content.

EXAMPLE 2: STABILITY OF THE PACKAGES AS A FUNCTION OF TIME

To demonstrate the stability of these packages with time, the viscosity of the concentrated solution of Example 1, containing 10% by weight of polymer and 25% by weight of surfactant, was measured at the time of preparation and 38 days later. The results appear in Table 2.

The solution viscosities are measured with the aid of a rheometer of the Rhéomat 30 (Contravès) type with a special unit adapted for high viscosities (Unit MSA/E). The values are obtained at various mechanical shear rates, expressed in $s^{-1}$.

TABLE 2

| Shear (s$^{-1}$) | 0.1 | 1 | 10 | 100 |
|---|---|---|---|---|
| Viscosity (mPas) | | | | |
| t = 0 | 9,000 | 4,000 | 1,600 | 1,000 |
| t = 38 days | 10,000 | 4,000 | 1,700 | 1,000 |

These results show that these solutions are stable for quite long storage times.

EXAMPLE 3: SOLUTION OF SCHIZOPHYLLAN AND OF SURFACTANT

The example is intended to demonstrate the effect of decreasing the viscosity of a schizophyllan solution obtained in a similar manner by ultrafiltration in the presence of surfactant (polymer concentration=1,000 ppm). The results obtained appear in Table 3 below.

TABLE 3

| Shear (s$^{-1}$) | 0.1 | 1 | 10 |
|---|---|---|---|
| Viscosity (mPas) | | | |
| 0% surfactant | 457 | 210 | 48 |
| 3% surfactant | 62 | 42 | 27 |

The results obtained for scleroglucan are thus also completely applicable in the case of schizophyllan.

We claim:

1. A process for the preparation of a concentrated liquid solution of scleroglucan comprising:
   i) subjecting a dilute solution of scleroglucan and a surfactant, with a scleroglucan/surfactant weight ratio of between 0.2 and 8.0, to ultrafiltration to obtain a concentrated liquid solution of from 5-40% by weight of scleroglucan.

2. A process for the preparation of a concentrated liquid solution of scleroglucan comprising:
   i) subjecting a dilute solution of 0.2 to 0.5% by weight of scleroglucan and a surfactant, with a scleroglucan/surfactant weight ratio of between 0.2 and 8.0, to ultrafiltration to obtain a concentrated liquid solution of from 5-40% by weight of scleroglucan.

3. The process according to claim 2, characterized in that the surface-active agent/polysaccharide weight ratio is between 0.5 and 5.

4. The process according to any one of claims 1 or 2, characterized in that the surface-active agent is chosen from anionic or neutral surfactants.

5. The process according to claim 4, characterized in that the surface-active agent has an HLB below 20.

6. The process according to claim 5, characterized in that the surface-active agent is chosen from polyoxyethylenated polyalkylphenols.

7. The process according to claims 1 or 2, characterized in that the ultrafiltration is performed with a membrane which has a cut-off threshold of between 20,000 and 100,000 daltons.

8. The process of claim 5, wherein said HLB is below 16.

9. The process of claims 1 or 2, wherein said surfactants are lipophilic.

* * * * *